US005776893A

United States Patent [19]
Borgstedt et al.

[11] Patent Number: 5,776,893
[45] Date of Patent: Jul. 7, 1998

[54] CRYSTALLINE HYDRATED LAYERED SODIUM AND POTASSIUM SILICATES AND METHOD OF PRODUCING SAME

[75] Inventors: Eric Von Rehren Borgstedt, Louisville, Ky.; Raymond P. Denkewicz, Jr., Providence, R.I.

[73] Assignee: PQ Corporation, Valley Forge, Pa.

[21] Appl. No.: 467,616

[22] Filed: Jun. 6, 1995

Related U.S. Application Data

[60] Division of Ser. No. 334,269, Nov. 3, 1994, Pat. No. 5,643,358, which is a continuation-in-part of Ser. No. 258,466, Jun. 10, 1994, Pat. No. 5,614,160, and a continuation-in-part of Ser. No. 270,489, Jul. 5, 1994.

[51] Int. Cl.$^6$ .............................. C11D 3/08; C01B 33/32
[52] U.S. Cl. ...................... 510/511; 510/108; 510/507; 510/531; 510/532; 423/332; 423/333; 423/334; 106/600; 106/604
[58] Field of Search ..................... 252/135, 174.25; 423/332, 333, 334; 510/591, 466, 531, 532, 108, 507; 106/600, 604

[56] References Cited

U.S. PATENT DOCUMENTS

| | | | |
|---|---|---|---|
| 2,640,756 | 6/1953 | Wills | 23/111 |
| 3,709,837 | 1/1973 | Weldes | 252/527 |
| 3,985,669 | 10/1976 | Krummel et al. | 252/116 |
| 4,180,485 | 12/1979 | Llenado | 252/532 |
| 4,276,205 | 6/1981 | Ferry | 252/528 |
| 4,585,642 | 4/1986 | Rieck | 423/333 |
| 4,664,839 | 5/1987 | Rieck | 252/175 |
| 4,806,327 | 2/1989 | Rieck et al. | 423/332 |
| 4,820,439 | 4/1989 | Rieck | 252/135 |
| 4,950,310 | 8/1990 | Rieck et al. | 34/295 R |
| 4,959,170 | 9/1990 | Ulrich et al. | 252/135 |
| 5,183,651 | 2/1993 | Schimmel et al. | 423/334 |
| 5,211,930 | 5/1993 | Schimmel et al. | 423/333 |
| 5,236,682 | 8/1993 | Schimmel et al. | 423/334 |
| 5,268,156 | 12/1993 | Schimmel et al. | 423/334 |
| 5,344,633 | 9/1994 | Sörensson et al. | 423/333 |
| 5,393,455 | 2/1995 | Poethkow et al. | 252/174.25 |
| 5,456,895 | 10/1995 | Tapper et al. | 423/332 |

FOREIGN PATENT DOCUMENTS

0578986A1  1/1994  European Pat. Off.

OTHER PUBLICATIONS

McCulloch, L., "A New Highly Silicious Soda–Silica Compound", J. Am. Chem. Soc. vol. 74, pp. 2453–2456, May 1952.

Johan and Maglione, "La Kanemite, Nouveau silicate de sodium hydrate de neoformation", Bull. Soc. Fr. Mineral. Crystallogr., 95, 371 (1972).

"Hydrated Crystalline Alkali Metal Polysilicates", The Chemistry of Silica, pp. 158–171, 1979.

R.K. Iler, "Ion Exchange Properties of a Crystalline Hydrated Silica", J. Colloid Sci., 19, pp. 648–657 (1964).

Beneke et al., "Kanemite–innercrystalline reactivity and relations to other sodium silicates", American Mineralogist, vol. 62, pp. 763–771 (1977).

J. Williamson et al., "The crystallisation of $Na_2O \cdot 2SiO_2$ glasses", Physics and Chemistry of Glasses, vol. 7, No. 4, (Aug. 1966).

Primary Examiner—Douglas J. McGinty
Assistant Examiner—Lorna M. Douyon
Attorney, Agent, or Firm—Ratner & Prestia

[57] ABSTRACT

A crystalline hydrated layered sodium and potassium silicate/amorphous sodium and potassium silicate composite material with predetermined hardness ion sequestration properties is achieved by controlling the process for forming the material. The process for producing the crystalline hydrated layered sodium and potassium silicate/amorphous is sodium and potassium silicate composite comprises hydrolyzing DB-1 crystalline sodium and potassium silicate glasses as a precursor material to produce the composite material known as DB-2. Hydrolysis of the DB-1 precursor material is achieved by adding typically up to 100.0 milliequivalents per gram of $H_3O^+$ ions or up to 50 milliequivalents per gram of $OH^-$ ions. The resulting DB-2 material can sequester $CA^{2+}$ ions, $Mg^+$ ions, or both, depending on the results desired, processing conditions, and starting materials used.

13 Claims, 1 Drawing Sheet

FIG. 1

CRYSTALLINE HYDRATED LAYERED SODIUM AND POTASSIUM SILICATES AND METHOD OF PRODUCING SAME

This application is a division of application Ser. No. 08/334,269, filed Nov. 3, 1994 now U.S. Pat. No. 5,643,258 which is is a continuation-in-part of application Ser. No. 08/258,466 filed Jun. 10, 1994 now U.S. Pat. No. 5,614,160 and a continuation-in-part of co-pending application Ser. No. 08/270,489 filed Jul. 5, 1994.

FIELD OF THE INVENTION

This invention relates to composite materials comprised of a crystalline hydrated layered alkali silicate and an amorphous alkali silicate that exhibit the ability to reduce the activity of hardness ions in laundry wash water. In particular, this invention relates to crystalline hydrated layered alkali silicate/amorphous alkali silicate composite materials useful as detergent ingredients.

BACKGROUND OF THE INVENTION

It is known that hard water ions, specifically calcium and magnesium, adversely affect the activity of soaps and detergents. These ions deactivate detergents and can form undesirable precipitates. Thus, it is desirable to remove these ions to avoid reaction with the detergent. One way to do this is to soften the water prior to introduction into a washing machine. In many parts of the world, this is impractical or impossible, but in most parts of the world it is expensive. Another approach is to remove hard water ions by reaction with another material in situ in the washer. Materials useful for removing hard water ions include alkali silicates (non-crystalline silicates, crystalline silicates and is zeolites), particularly hydrated layered alkali silicates.

Layered alkali silicates are materials chemically comprising $SiO_2$ organized into layers (sheets) having a negative charge, with alkali cations for charge compensation and, in some cases, water between the layers (these materials are known as HLS). Hydrated layered sodium silicates have been known for a number of years, either synthetically produced or naturally occurring (McCulloch J. Am. Chem. Soc. 75, 2453 (1952)). The $SiO_2/Na_2O$ ratios of these silicates range from 4 to 20.

The first synthetic hydrated layered silicate, having a $SiO_2/Na_2O$ ratio of 4, was reported by Wills in 1953 (U.S. Pat. No. 2,640,756). This synthetic hydrated layered silicate was claimed to be useful as an ion exchange material, specifically for calcium. However, the structure of the synthetic hydrated layered silicate prepared by Wills was not disclosed. In 1972, a naturally occurring tetrasilicate ($SiO_2/Na_2O=4$) was reported by Johan and Maglione (Johan and Maglione, Bull. Soc. Fr. Mineral. Crystallogr. 95, 371 (1972)). The structure of this material was identified as a hydrated layered silicate, and the name kanemite was given to this mineral. In *The Chemistry of Silica* 1979 and J. Colloid Sci 19, 7, 648 (1964), Iler concluded from the results of Johan and Maglione that the synthetic hydrated layered silicate claimed by Wills in 1953 was kanemite. Furthermore, Iler reported that crystalline hydrated layered alkali silicates have the ability to ion exchange their sodium ions and protons with other metal ions or organic ions. Iler's observations are consistent with Wills' experimental findings on the calcium ion exchange ability of kanemite materials. The synthesis of kanemite has also been reviewed by Beneke and Lagaly (Beneke and Lagaly, Amer. Mineral. 62, 763 (1977)).

In recent years the use of crystalline layered sodium silicates, especially crystalline sodium disilicates, as detergent builders has been suggested (see U.S. Pat. Nos. 4,585, 642; 4,806,327; 4,950,310; 4,820,439; 4,664,839; and 4,959,170). These crystalline sodium disilicates were synthesized and reported as early as 1966 (Williamson and Glasser, Physics and Chemistry of Glasses, Vol. 7, No. 4, August, 1966). While these patents claim that crystalline sodium disilicates function when incorporated into detergents, the disclosed crystalline layered silicates have not been accepted readily by the worldwide detergent industry due to their poor ability to remove hardness ions from wash water at temperatures below about 30° C.

Furthermore, there are circumstances where it may be necessary or desirable to remove only one hardness ion or the other ($Ca^{2+}$ or $Mg^{2+}$). Some detergent formulations have been developed which work synergistically with one hardness ion. Accordingly, it may be undesirable to remove that ion, or it may be desirable to reduce it to a particular concentration to optimize detergent performance while removing the other ion. Finally, where only one ion is present in water of a particular geographic region, it is only that ion (either calcium or magnesium) which can be removed from the wash water. In the past, tailoring builder materials to selectively sequester hardness ions was difficult or impossible.

It is an object of this invention to provide a composite material comprising a hydrated layered alkali silicate, including both sodium and potassium, and an amorphous alkali silicate, including both sodium and potassium, that is more suitable as a detergent ingredient than previously suggested materials that it would replace. A further object of this invention is to provide a detergent composition that includes a hydrated layered alkali silicate/amorphous alkali silicate composite that reduces the activity of hardness ions in the wash water without producing the detrimental precipitates of these ions produced by some other detergent additives including sodium carbonate. It is a still further object of this invention to provide the chemistry and the processing necessary to tailor the detergent builder and ion sequestering properties of these hydrated layered alkali silicate/amorphous alkali silicate composite materials.

SUMMARY OF THE INVENTION

The present invention pertains to a crystalline hydrated layered sodium and potassium silicate/amorphous sodium and potassium silicate composite material with predetermined hardness ion sequestration properties achieved by controlling of the process for forming the material, and a process for making the material. The present invention utilizes crystalline sodium and potassium silicate glasses as a precursor material to produce the composite material known as DB-2. Although the precursor materials themselves can be utilized to sequester magnesium and calcium ions in solution, the DB-2 composite products of the present invention have superior detergent building properties compared to their individual components.

The process for producing the crystalline hydrated layered sodium and potassium silicate comprises hydrolyzing the crystalline precursor materials in an alkaline or acidic media followed by drying. The hydrolysis process utilized is disclosed in U.S. patent application Ser. No. 08/258,466, which is incorporated herein by reference. This process, when applied to a crystalline sodium/potassium silicate starting material, produces a structure which is similar to a kanemite structure but contains both potassium and sodium cations between the layers (sheets) of $SiO_2$. The resultant crystalline phase is referred to herein as DB-2. It is a composite material comprising a hydrated layered alkali silicate and an amorphous alkali silicate which is produced to provide predetermined hardness ion binding properties.

Although the above-referenced application discloses hydrolyzing sodium silicate glasses to produce a kanemite structure, the present invention differs in that hydrolysis of a sodium/potassium glass to produce a crystalline hydrated layered alkali silicate achieves a number of advantages. The first advantage is that a crystalline hydrated layered sodium potassium silicate/amorphous sodium potassium silicate composite material having improved hardness ion binding properties as compared to a pure crystalline hydrated layered sodium silicate/amorphous sodium silicate composite is achieved by controlling the process for forming the material. Additionally, the use of potassium in conjunction with sodium glass affords the opportunity to eliminate the spray drying process required in converting pure sodium silicate glasses through their delta-phase crystalline forms, which is required to achieve good hardness ion binding properties in the finished material. The spray drying process is energy intensive and expensive. Eliminating it makes the present process much more desirable economically.

DETAILED DESCRIPTION OF THE INVENTION

Figure 1:
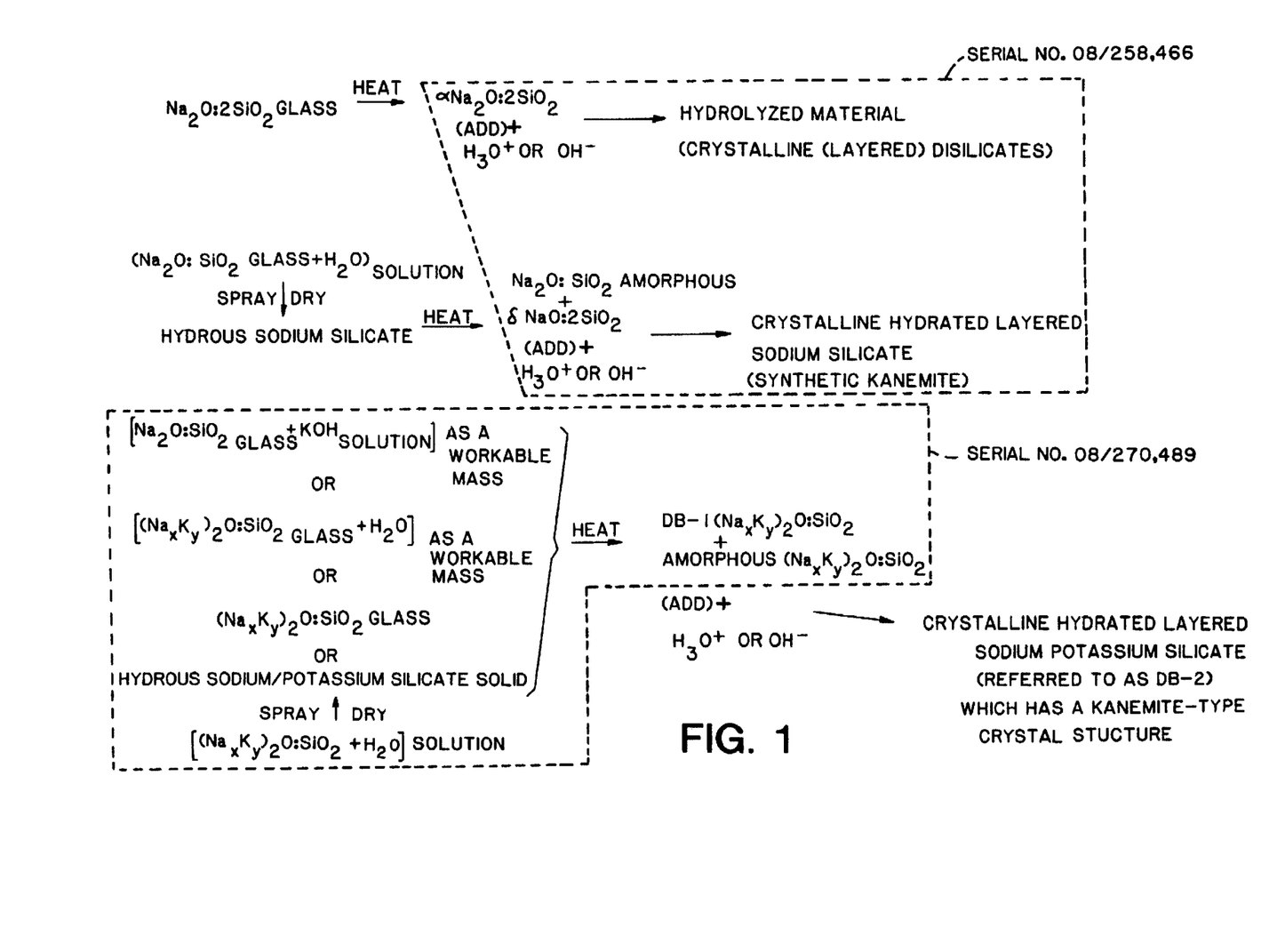
FIG. 1 is a schematic representation of hydrolysis process used to produce the hydrated layered sodium silicates of U.S. Pat. No. 5,614,160 and of the hydrolysis process of the present invention used to produce sodium/potassium silicates.

The composite materials of the present invention possess superior properties as compared with prior art detergent builder/sequestering materials. These composite materials remain free flowing powders under ambient or high humidity conditions. Under similar humidity conditions, prior art detergent builders such as crystalline disilicates become a dilatent mass. In addition, the hydrated layered silicate composite materials of this invention are more effective in reducing the activity of hardness ions in laundry wash water than previously reported kanemite or crystalline disilicate materials. This is observed in a pH range of 8 to 10, the operating pH range of most detergents currently in use. The detergent building properties of the hydrated layered silicate/amorphous silicate composite materials of the present invention can be adjusted to maximize performance in varying wash conditions. The inventors believe such adaptability has not heretofore been known.

The exact silica to alkali ratio of the hydrated layered silicate included in the composite of the present invention depends on the history of the material and the extent of any hydrolysis that has taken place. The X-ray diffraction pattern of the composite is material indicates that it includes hydrated layered silicate with the same crystalline structure as that of the mineral kanemite. Kanemite has a distinctive X-ray diffraction pattern summarized in Table 1 below. The data in Table 1 is summarized from Joint Committee on Powder Diffraction Standards (JCPDS) File #25-1309. The mineral kanemite has been reported to have a $SiO_2/Na_2O$ ratio of 4. However pure kanemite produced in accordance with the teachings of Beneke and Lagaly (see above) was shown to have a $SiO_2/Na_2O$ ratio of only 3.36. This material gave an X-ray diffraction pattern indicating pure kanemite which shows that the $SiO_2/Na_2O$ ratio of pure kanemite may be variable.

TABLE 1

| X-ray Diffraction Pattern of Kanemite | |
|---|---|
| d-spacing (Å) | I/I$_o$ |
| 10.3 | 100 |
| 5.13 | 50 |
| 4.01 | 100 |
| 3.64 | 50 |
| 3.44 | 90 |
| 3.16 | 70 |
| 3.09 | 70 |
| 2.480 | 80 |
| 2.386 | 60 |
| 2.073 | 40 |
| 1.995 | 50 |
| 1.929 | 40 |
| 1.464 | 40 |
| 1.191 | 40 |

The comoosition of kanemite with a $SiO_2/Na_2O$ ratio of 4 is 56.08% $SiO_2$, 14.49% $Na_2O$, and 29.43% water on a weight basis. When heated to 150C, the weight lost due to water removal is approximately 16.82%. An additional 8.41% weight reduction occurs when water is driven off at temperatures between 150° C. and 280° C. The remaining 4.2% water can be driven off at temperatures above 280° C. These dehydrated forms of kanemite also have distinctive X-ray diffraction patterns which can be found in JCPDS Files #27-709 ($NaHSi_2O_5$-$H_2O$) and #27-708 ($NaHSi_2O_5$) which are incorporated herein by reference.

Synthetic kanemite (which will be referred to herein simply as "kanemite" since it possesses the same X-ray diffraction pattern as natural kanemite) can be prepared by various methods including the hydrolysis of various species of crystalline sodium disilicates or the base exchange of disilicic acids. Kanemite can also be recovered as the crystallization product of sodium silicate solutions that have been stored for long periods of time at ambient conditions or for shorter periods of time at elevated temperatures. Seeding of the sodium silicate solutions is advantageous if kanemite production is desirable.

Synthesis of the crystalline hydrated layered sodium and potassium silicate/amorphous sodium and potassium silicate composite materials of the present invention can be accomplished by hydrolyzing precursor DB-1 materials. The precursor materials can be made by any one of several processes as disclosed in U.S. patent application Ser. No. 08/270,489 which is incorporated herein by reference.

The first process which can be utilized to produce the precursor material involves the production of an amorphous Na/K silicate glass in a furnace using conventional sodium silicate production means. The term Na/K silicate glass as used herein refers to a silicate glass (i.e., an amorphous material) containing both sodium and potassium ions. This amorphous glass is then milled and optionally mixed with water. The mixture is calcined to produce the precursor starting material of the present invention which is a DB-1 phase crystalline composite material. The calcination is generally performed at temperatures between about 500° C. and 800° C., although calcination temperatures outside this range may be effective with specific formulations. Temperatures outside this range generally yield either an amorphous alkali silicate or undesirable crystalline alkali silicates. The calcined material can then be milled to the appropriate particle size prior to further processing.

A second process for producing the DB-1 precursor material involves the production of a sodium silicate glass by conventional means. This glass is then milled and mixed with water and a suitable potassium compound such as potassium hydroxide. This mixture is calcined to produce the DB-1 precursor.

In a third process for producing these precursor starting materials, amorphous Na/K silicate glass is dissolved in soft water and then spray dried to produce a hydrated Na/K silicate, followed by calcination to produce the DB-1 phase precursor material of the present invention. In each of the above processes, the product can be recycled into the calciner to seed the formation of the desired crystalline product.

The synthesis of the hydrated layered sodium and potassium silicate/amorphous sodium and potassium silicate composites of the present invention can be produced by performing a controlled hydrolysis of a DS-1 crystalline silicate and can be accomplished by the following process. Starting with the DB-1 precursor materials, a slurry is made using double deionized water which is utilized to ensure that the resultant material is free of hardness ions. The slurry is then hydrolyzed using either hydronium or hydroxyl ions which can be accomplished by introducing various amounts of hydrochloric or other suitable acid or potassium or sodium hydroxide or other suitable base, respectively. Typically, hydrochloric acid is used in amounts which yield up to and including 100 meq hydronium ions per gram of DB-1 material, while potassium hydroxide is used in amounts which yield up to and including 50 meq of hydroxyl ions per gram DB-1 material. More preferably, hydrochloric acid is used in amounts which yield up to 10.0 meq hydronium ions per gram of DB-1 material. The materials of the present invention are produced by either filtering or spray-drying the hydrolyzed DB-1 slurry. The advantages of performing a spray-drying operation over some other separation method (such as crystallization and filtering) upon the hydrolyzed slurry is that the total recovery of solids from the slurry is greater and a composite product results which has superior ion binding performance compared to hydrated layered sodium silicate/ amorphous sodium silicate composites produced by the same process with a different separation technique.

The resulting hydrolyzed material is a hydrated crystalline layered sodium and potassium silicate/amorphous sodium and potassium silicate composite material, referred to herein as DS-2, and typically yielding the following X-ray diffraction pattern:

TABLE 2

| X-ray Diffraction Pattern of DB-2 |
| --- |
| d-spacing (Å) |
| 10.30 |
| 5.13 |
| 4.02 |
| 3.63 |
| 3.43 |
| 3.16 |
| 3.09 |
| 2.47 |
| 2.42 |
| 2.09 |

Based upon the X-ray diffraction pattern results in Table 2, it is believed that the DB-2 material of the present invention contains both sodium and potassium within a kanemite crystalline phase. It is to be understood, however, that this crystalline phase is not to be taken as a limitation of the present invention in that a different crystalline phase may be present.

In application Ser. No. 08/258,466, a hydrolysis process was disclosed for producing a crystalline hydrated layered sodium silicate/amorphous sodium silicate composite material having a synthetic kanemite phase. This process required spray dying the sodium silicate precursor materials in order to produce the proper synthetic kanemite phase. In utilizing potassium in conjunction with sodium in the precursor material in the present invention, however, the spray-drying step which is required in the preparation of pure delta phase sodium disilicate precursor materials for hydrolysis can be eliminated while still achieving the desired kanemite phase in the final product. That is, a kanemite crystalline structure results from hydrolysis of DB-1 phase sodium potassium precursor materials which can be produced without the spray drying step necessary to produce the delta phase sodium silicate precursor required for hydrolysis to produce Kanemite in a pure sodium system. Thus hydrolysis of the sodium and potassium precursor materials as disclosed in the present application provides a more economical process since a spray-drying step can be eliminated when producing the precursor materials while providing a resulting material with enhanced hardness ion binding properties.

The concentration of the ions (hydronium or hydroxyl) in the hydrolyzing media will dictate the final detergent builder properties, including the $SiO_2$/alkali ratio of the composite material. The hydrolyzed composite material can either be dried by filtering the slurry and drying the filter cake at temperatures up to 100° C. or by spray drying at temperatures up to 120° C.

The hydrolyzed product is then pulverized by ball milling to produce the resultant hydrated layered amorphous alkali silicate composite containing a kanemite phase.

The resulting composite material provides excellent builder behavior for detergents. For example, the composite material does not cake when exposed to atmospheric conditions. The material remains a free flowing powder when exposed to 80% relative humidity for a period of at least three months. Ordinary crystalline disilicates become a dilatent mass within a few weeks at such humidity. The buffering capacity of the composite material is excellent. Buffering takes place in an attractive pH range for effective laundering, i.e., a pH range of about 8 to 10.

The composite material of the present invention has a high ion binding capacity and will reduce the activity of both hardness water ions ($Ca^{2+}$ and $Mg^{2+}$) in wash water if desired. This is superior to presently used detergent builders such as Zeolite NaA and delta-phase disilicate. Zeolite NaA primarily exchanges calcium, and delta-phase disilicate requires much higher pH ranges, generally 10 to 12, to provide effective hardness ion binding capacity. Further, delta-phase disilicate may dissolve at these high pH conditions to produce undesirable precipitates of calcium and magnesium silicates or hydroxides.

The DB-2 hydrated layered sodium and potassium silicate/amorphous sodium and potassium silicate detergent builder of the present invention can be formulated into detergent formulations with most commonly used ingredients to form stable compositions. Anionic, non-ionic and zwiterionic surfactants can be used in detergent formulations. Co-builders such as crystalline alumino silicates (including clays and zeolites), organic sequesterants, and condensed polyphosphates are also compatible with the material of the present invention, as are other conventional detergent ingredients. More particularly, the zeolites utilized can include those such as Zeolite NaA having a $SiO_2/Al_2O_3$ ratio of 2.0–2.2, Zeolite P having a $SiO_2/Al_2O_3$ ratio of 2.0–7.0 (including maximum aluminum NaP phase having a $SiO_2/Al_2O_3$ ratio of 2.0–2.3 to yield the maximum aluminum possible in the P phase), Zeolite NaX having a $SiO_2/Al_2O_3$ ratio of 2.3–5.0, and Zeolite K/NaX having a $SiO_2/Al_2O_3$ ratio of 2.0–2.3. Spray drying, agglomeration and dry blending methods can be utilized to form stable and efficient detergents containing the products of the present invention.

Further properties and advantages of the hydrated layered sodium and potassium silicates/amorphous sodium and potassium silicate composite commositions of the present invention are illustrated in the following examples. The examples are divided into three categories to illustrate the hydrolyzed materials of the present invention as follows: 1) examples 1–9 enumerate the production of the DB-1 phase precursor materials which are to be hydrolyzed, 2) examples 10–45 are comparative examples of hydrated layered sodium silicate/amorphous sodium silicate composites disclosed and produced by the hydrolysis process as disclosed in U.S. patent application Ser. No. 08/258,466, and 3) examples 46–121 are the hydrolyzed product of the present invention (i.e., crystalline hydrated layered sodium and potassium silicate/amorphous sodium and potassium silicate composite materials).

EXAMPLES

The proportions are in parts by weight (pbw), percent weight (%), parts per million (ppm), moles or equivalents unless otherwise indicated. The notation, $DI^2$-water, refers to double distilled water.

The calcium and magnesium ion exchange rates and capacities were determined for various products and are reported as the calcium exchange rate (CER), calcium exchange capacity (CEC), magnesium exchange rate (MgER), and magnesium exchange capacity (MgEC). The results shown in the tables are expressed as milligrams (mg) of $CaCO_3$ per gram (g) of anhydrous product for both calcium and magnesium. For brevity, the calcium and magnesium exchange capacities of the products of this invention, as described in the disclosure and recited in the claims, can also be (and frequently are) expressed in units of milliequivalents of Ca (or Mg) per gram of anhydrous product.

The calcium and magnesium performance (CER, CEC, MgER, and MgEC) were determined as follows. The product (0.5 grams on an anhydrous basis) was reacted with 250 milliliters (ml) of a solution containing either calcium or magnesium ions. The concentration of these solutions was 1000 ppm expressed as $CaCO_3$. The stirred reaction mixture was buffered at a pH of 10 with 2 to 3 ml of a solution of $NH_4Cl$ and $NH_4OH$. The temperature was held at 25° C. (unless otherwise noted) during the exchange reaction. An aliquot (15 ml) was removed after 2 minutes to determine the calcium and magnesium exchange rates (CER and MgER) by pulling the suspension through a 1.0 micron filter into a syringe. A second aliquot was removed at 15 minutes to determine the calcium and magnesium exchange capacities (CEC and MgEC).

The filtrates from the calcium exchange reaction were analyzed for calcium in solution as follows. A 5 ml aliquot of filtrate was combined with 5 ml of 1 molar NaOH and about 100 milligrams of hydroxy naphthol blue indicator. A titration to a definite blue end point was carried out with 0.005 molar ethylene diaminotetracetic acid (EDTA), and the volume of EDTA used was recorded.

A blank titration using 5 ml of the 1000 ppm $CaCO_3$ solution was carried out using the same method and the volume of EDTA was recorded. Filtrates from the magnesium exchange reaction were analyzed in the same maaner except that 5 ml of an $NH_4OH/NH_4Cl$ buffer and about 100 mg of Erichrome Black T (3-hydroxy-4-|(1-hydroxy-2-naphthalenyl)azo]-7-nitro-1-naphthalenesulfonic acid monosodium salt, available from Sigma Chemical Co. of St. Louis, Mo.) were used.

The rates and capacities for calcium and magnesium ions removed by the product were calculated as mg of $CaCO_3/g$ of anhydrous product as follows:

$$\frac{\text{milligrams } CaCO_3}{\text{gram anhydrous product}} = \frac{(B - V) \cdot M \cdot FW \cdot 50}{[(100 - LOI)/100] \cdot W}$$

where:

B=volume of EDTA for blank titration (ml)

V=volume of EDTA for sample titration (ml)

M=Molarity of EDTA solution

FW=Formula Weight of $CaCO_3$ (100.1 g/mole)

LOI=Loss on Ignition of product at 800° C. (%)

W=Weight of product (grams)

Phase identification of the examples was determined using standard X-ray diffraction techniques. A 5–50 two-theta scan was used.

To assess the effect of the hydrolysis process upon the sodium and potassium concentrations in the final layered silicates, eight samples were analyzed. The results, found in Table 16, show that sodium and potassium was present in the crystalline phase of the final composite material and that there was little variation in the final sodium and potassium concentrations which resulted from the starting materials. The analysis was based on a hot acidic extraction of the potassium and sodium from powdered samples followed by atomic absorption (AA) determination of the extract. Specifically, 1 gram portions of the samples were refluxed in 40 mL of 2N HCl for 1 hour. After filtering, the residue was refluxed again in fresh acid. After filtering again, the residue was washed three times with hot water. The filtrates were combined, diluted to 200 g, and analyzed for Na and K on a Perkin-Elmer Model 603 AA manufactured by the Perkin-Elmer Corporation, Pottstown, Pa.

EXAMPLES 1–3: PREPARATION OF SODIUM DISILICATE PRECURSORS TO BE BYDROLYZED TO PRODUCE HYDRATED LAYERED SODIUM SILICATE/ AMORPHOUS SODS SILICATE COMPOSITES TO BE USED FOR CCMPARISON TO TEE MATERIALS OF OUR INVENTION.

Example 1: Delta-phase; $SiO_2/Na_2O=2$

Hydrated layered sodium silicate/amorphous sodium silicate composite materials can be produced from crystalline Na-disilicates according to the following process. An amorphous sodium silicate glass, having a composition of $SiO_2/Na_2O$ in a mole ratio of 2.0, is prepared by the fusion of a sodium carbonate and silica between 1100° C. to 1300° C. followed by rapid cooling of the molten sodium glass. The cool amorphous sodium glass is dissolved in $DI^2$-water to produce a liquid silicate. The liquid silicate is spray dried to produce a sodium hydrous polysilicate having approximately 18–22 percent by weight water. The sodium hydrous polysilicate is heated to 700° C. at a heating rate of 5° C./minute and held at this temperature for 3 hours followed by ball milling of the cooled crystalline product whereby particles of less than 50 microns are produced. The crystalline sodium silicate phase present in the product as identified by x-ray diffraction was determined to be delta-phase disilicate.

Example 2: Delta-phase; $SiO_2/Na_2O=2.4$

Preparation of hydrated layered sodium silicate/amorphous sodium silicate composite materials to be used as a comparison to the materials of our invention begin by synthesizing a crystalline disilicate which is produced according to the following process. The first step in the synthesis of a crystalline disilicate is the preparation of an amorphous sodium silicate glass, having a composition of $SiO_2/Na_2O$ in a mole ratio of 2.4, by the fusion of a sodium carbonate and silica between 1100° C. to 1300° C. followed by rapid cooling of the molten sodium glass. The cool amorphous sodium glass is dissolved in $DI^2$-water to produce a liquid silicate. The liquid silicate is spray dried to produce a sodium hydrous polysilicate having approximately 18–22 percent by weight water. The sodium hydrous polysilicate is heated to 700° C. at a heating rate of 5° C./minute and held at this temperature for 3 hours followed by ball milling of the cooled crystalline product whereby particles of less than 50 microns are produced. The crystalline sodium silicate phase present in the product as identified by x-ray diffraction was determined to be delta disilicate.

Example 3: Delta-phase; $SiO_2/Na_2O=3.22$

Preparation of hydrated layered sodium silicate/amorphous sodium silicate composite materials to be used as a comparison to the materials of our invention begin by synthesizing a crystalline disilicate which is produced according to the following process. The first step in the synthesis of a crystalline disilicate is the preparation of an amorphous sodium silicate glass, having a composition of $SiO_2/Na_2O$ in a mole ratio of 3.22, by the fusion of a sodium carbonate and silica between 1100° C. to 1300° C. followed by rapid cooling of the molten sodium glass. The cool amorphous sodium glass is dissolved in $DI^2$-water to produce a liquid silicate. The liquid silicate is spray dried to produce a sodium hydrous polysilicate having approximately 18–22 percent by weight water. The sodium hydrous polysilicate is heated to 700° C. at a heating rate of 5° C./minute and held at this temperature for 3 hours followed by ball milling of the cooled crystalline product whereby particles of less than 50 microns are produced. The crystalline sodium silicate phase present in the product as identified by x-ray diffraction was determined to be delta disilicate.

Examples 4–9: Preparation of Crystalli Na.K-Silicate Precursops (DB-1 Phase) to be Rydrolyzed to Produce Hydrated Layered Na-K Silicate/Amorpeous Na-K Silicate Composites of the Present Invention Example 4: DB-1 phase produced from Na/K glass; $SiO_2/(0.9\ Na_2O+0.1K_2O)=1.7$ Preparation of the materials of our invention begin by synthesizing a crystalline DB-1 phase silicate which is produced according to the following process. The first step in the synthesis of a crystalline DB-1 phase silicate is the preparation of an amorphous sodium/potassium silicate glass, having a composition of $SiO_2/(0.9Na_2O+0.1K_2O)$ in a mole ratio of 1.7, by the fusion of a sodium carbonate, potassium carbonate, and silica between 100° C. to 1300° C. followed by rapid cooling of the molten sodium/potassium glass. The cool amorphous sodium/potassium glass is ball milled whereby particles of less than 200 microns are produced. A mixture of 8 pbw of ground sodium/potassium glass and 2 pbw of $DI^2$-water is heated to 700° C. at a heating rate of 5° C./minute and held at this temperature for 3 hours followed by ball milling of the cooled crystalline product whereby particles of less than 50 microns are produced. The crystalline sodium/potassium silicate phase present in the product as identified by x-ray diffraction was determined to be crystalline DB-1 phase silicate, as disclosed in co-pending patent application Ser. No. 08/270,489.

Example 5: DB-1 phase produced from Na/K glass; $SiO_2/(0.9\ Na_2O+0.1K_2O)=2.0$ Preparation of the materials of our invention begin by synthesizing a crystalline DB-1 phase silicate which is produced according to the following process. The first step in the synthesis of a crystalline DB-1 phase silicate is the preparation of an amorphous sodium/potassium silicate glass, having a composition of $SiO_2/(0.9Na_2O+0.1K_2O)$ in a mole ratio of 2.0, by the fusion of a sodium carbonate, potassium carbonate, and silica between 1100° C. to 1300° C. followed by rapid cooling of the molten scdium/potassium glass. The cool amorphous sodium/potassium glass is ball milled whereby particles of less than 200 microns are produced. A mixture of 8 pbw of ground sodium/potassium glass and 2 pbw of $DI^2$-water is heated to 700° C. at a heating rate of 5° C./minute and held at this temperature for 3 hours followed by ball milling of the cooled crystalline product whereby particles of less than 50 microns are produced. The crystalline sodium/potassium silicate phase present in the product as identified by x-ray diffraction was determined to be crystalline DB-1 phase silicate.

Example 6: DB-1 phase produced from Na/K glass; $SiO_2/(0.8Na_2O+0.2K_2O)=2.0$

Preparation of the materials of our invention begin by synthesizing a crystalline DB-1 phase silicate which is produced according to the following process. The first step in the synthesis of a crystalline DB-1 phase silicate is the preparation of an amorphous sodium/potassium silicate glass, having a composition of $SiO_2/(0.8Na_2O+0.2K_2O)$ in a mole ratio of 2.0, by the fusion of a sodium carbonate, potassium carbonate, and silica between 1100° C. to 1300° C. followed by rapid cooling of the molten sodium/potassium glass. The cool amorphous sodium/potassium glass is ball milled whereby particles of less than 200 microns are produced. A mixture of 8 pbw of ground sodium/potassium glass and 2 pbw of $DI^2$-water is heated to 700° C. at a heating rate of 5° C./minute and held at this temperature for 3 hours followed by ball milling of the cooled crystalline product whereby particles of less than 50 microns are produced. The crystalline sodium/potassium silicate phase present in the product as identified by x-ray diffraction was determined to be crystalline DB-1 phase silicate.

Example 7: DB-1 phase produced from Na/K glass; $SiO_2/(0.9Na_2O+0.1K_2O)=2.4$

Preparation of the materials of our invention begin by synthesizing a crystalline DB-1 phase silicate which is produced according to the following process. The first step in the synthesis of a crystalline DB-1 phase silicate is the preparation of an amorphous sodium/potassium silicate glass, having a composition of $SiO_2/(0.9Na_2O+0.1K_2O)$ in a mole ratio of 2.4, by the fusion of a sodium carbonate, potassium carbonate, and silica between 1100° C. to 1300° C. followed by rapid cooling of the molten sodium/potassium glass. The cool amorphous sodium/potassium glass is ball milled whereby particles of less than 200 microns are produced. A mixture of 8 pbw of ground sodium/potassium glass and 2 pbw of DI$^2$-water is heated to 700° C. at a heating rate of 5° C./minute and held at this temperature for 3 hours followed by ball milling of the cooled crystalline product whereby particles of less than 50 microns are produced. The crystalline sodium/potassium silicate phase present in the product as identified by x-ray diffraction was determined to be crystalline DB-1 phase silicate.

Example 8: DB-1 phase produced from Na/K glass; $SiO_2/(0.9Na_2O+0.1K_2O)=3.22$

Preparation of the materials of our invention begin by synthesizing a crystalline DB-1 phase silicate which is produced according to the following process. The first step in the synthesis of a crystalline DB-1 phase silicate is the preparation of an amorphous sodium/potassium silicate glass, having a composition of $SiC_2/(0.9Na_2O+0.1K_2O)$ in a mole ratio of 3.22, by the fusion of a sodium carbonate, potassium carbonate, and silica between 1100° C. to 1300° C. followed by rapid cooling of the molten sodium/potassium glass. The cool amorphous sodium/potassium glass is ball milled whereby particles of less than 200 microns are produced. A mixture of 8 pbw of ground sodium/potassium glass and 2 pbw of DI$^2$-water is heated to 700° C. at a heating rate of 5° C./minute and held at this temperature for 3 hours followed by ball milling of the cooled crystalline product whereby particles of less than 50 microns are produced. The crystalline sodium/potassium silicate phase present in the product as identified by x-ray diffraction was determined to be crystalline DB-1 phase silicate.

Example 9: DB-1 phase produced from Na glass and KOH; Ground glass/KOH/DI$^2$ -H$_2$O Preparation of the materials of our invention begin by synthesizing a crystalline DB-1 phase silicate which is produced according to the following process. The first step in the synthesis of a crystalline DB-1 phase silicate is the preparation of an amorphous sodium silicate glass, having a composition of $SiO_2/Na_2O$ in a mole ratio of 2.0, by the fusion of a sodium carbonate and silica between 1100° C. to 1300° C. followed by rapid cooling of the molten sodium glass. The cool amorphousسsodium glass is ball milled whereby particles of less than 200 microns are produced. A mixture of 8 pbw of ground sodium silicate glass, 11 pbw of 10 molar KOH solution, and 9 pbw of DI$^2$-water is heated to 700° C. at a heating rate of 5° C./minute and held at this temperature for 3 hours followed by ball milling of the cooled crystalline sodium/potassium silicate whereby particles of less than 50 microns are produced. The crystalline sodium/potassium silicate phase present in the product as identified by x-ray diffraction was determined to be crystalline DB-1 phase silicate.

COMPARATIVE EXAMPLES 10–45: PREPARATION OF HYDRATEI LAYERED Na-SILICATE/AMOPROUS Na-SILICATE COMPOSITE MATERIALS FOR COMPARISON TO THE SODIUM/POTASSIUM MATERIALS OF OUR INVENTION

Comparative Examples 10–18: Sodium Hydrated Layered Silicate (HLS) Composite Material; $SiO_2/Na_2O=2.0$; ions utilized for hydrolysis: $H_3O^+$ A hydrated layered sodium silicate/amorphous sodium silicate composite material was prepared according to the following process. Twenty grams of product from Example 1 was slurried in 300 milliliters of DI$^2$-water containing various amounts of hydrochloric acid (HCl), as described in Table 1, for 2 minutes followed by filtering and drying at ambient conditions. The product was pulverized by ball milling. X-ray diffraction revealed that a kanemite phase was present.

As explained, the product is milled both before and after hydrolyzation. Although ball milling is specified, any appropriate type of milling may be used. Preferably, such milling will reduce the average particle size of the product to less than 200 microns prior to hydrolyzation and to less than 75 microns after hydrolyzation. This will produce material with sufficient surface area to allow diffusion of the hydrolyzing agent during hydrolysis, and to provide a sufficiently small enough particle to allow for rapid removal of hardness ions upon introduction into the wash water. If the particles are too large before hydrolysis, only the outer particle layers may be hydrolyzed resulting in partially hydrolyzed product with reduced effectiveness. Similarly, if the particles are too large after hydrolysis, the rate of removal of hardness ions will be controlled by the rate of diffusion into the particle. Generally, the larger the particle, the slower the diffusion of hardness ions will be into the exchanging material.

Elemental analysis indicated that the $SiO_2/Na_2O$ ratio of the products synthesized depended on the concentration of hydronium ions used during the hydrolysis step, as may be seen in Table 1. Hardness ion binding performance was observed to vary with the $SiO_2$/Alkali ratio of the resulting product (which was a function of the $H_3O^+$ concentration), as observed in Table 1.

TABLE 1

Hydrated Layered Silicates Syntheiszed the by Hydrolysis of Delta Phase Product with a SiO$_2$/Na$_2$O of 2.0 from Example 1

| Example No. | Amount of product from Example 1 (grams) | meq H$_3$O$^+$/gram anhydrous product from Example 1 (acid used was 2N HCl) | SiO$_2$/Na$_2$O | LOI % | CER | CEC | MgER | MgEC |
|---|---|---|---|---|---|---|---|---|
| 10 | 20 | 0 | 2.20 | 13.98 | 228 | 259 | 253 | 335 |
| 11 | 20 | 0.24 | 2.35 | 15.72 | 249 | 272 | 273 | 345 |
| 12 | 20 | 0.60 | 2.45 | 22.60 | 238 | 291 | 331 | 370 |
| 13 | 20 | 1.20 | 2.42 | 22.60 | 225 | 274 | 192 | 293 |
| 14 | 20 | 2.40 | 2.74 | 31.07 | 241 | 294 | 225 | 324 |
| 15 | 20 | 3.00 | 2.93 | 27.16 | 150 | 275 | 122 | 184 |

TABLE 1-continued

Hydrated Layered Silicates Syntheiszed the by Hydrolysis of Delta Phase Product with a $SiO_2/Na_2O$ of 2.0 from Example 1

| Example No. | Amount of product from Example 1 (grams) | meq $H_3O^+$/gram anhydrous product from Example 1 (acid used was 2N HCl) | $SiO_2/Na_2O$ | LOI % | CER | CEC | MgER | MgEC |
|---|---|---|---|---|---|---|---|---|
| 16 | 20 | 3.60 | 3.13 | 27.70 | 166 | 284 | 110 | 164 |
| 17 | 20 | 4.20 | 3.00 | 26.00 | 183 | 286 | 112 | 192 |
| 18 | 20 | 4.80 | 3.25 | 23.68 | 197 | 282 | 30 | 95 |

Comparative Examples 19–29: Sodium HLS Composite Material; $SiC_2/Na_2O=2.4$; ions utilized for hydrolysis: $H_3O^+$ A hydrated layered sodium silicate/amorphous sodium silicate composite material was prepared according to the following process. Twenty grams of product from Example 2 was slurried in 300 milliliters of $DI^2$-water containing various amounts of hydrochloric acid (HCl), as described in Table 2, for 2 minutes followed by filtering and drying at ambient conditions. The product was pulverized by ball milling. X-ray diffraction revealed that a kanemite phase was present.

Elemental analysis indicated that the $SiO_2/Na_2O$ ratio of the products synthesized depended on the concentration of hydronium ions used during the hydrolysis step, as may be seen in Table 2. Hardness ion binding performance was observed to vary with the $SiO_2$/Alkali ratio of the resulting product (which was a function of the $H_3O^+$ concentration), as observed in Table 2.

TABLE 2

Hydrated Layered Silicates Syntheiszed by the Hydrolysis of Delta Phase Product with a $SiO_2/Na_2O$ of 2.4 from Example 2

| Example No. | Amount of product from Example 2 (grams) | meq $H_3O^+$/gram anhydrous product from Example 2 (acid used was 2N HCl) | $SiO_2/Na_2O$ | LOI % | CER | CEC | MgER | MgEC |
|---|---|---|---|---|---|---|---|---|
| 19 | 20 | 0 | 3.94 | 25.60 | 206 | 271 | 63 | 163 |
| 20 | 20 | 0.20 | 4.50 | 25.44 | 221 | 295 | 161 | 270 |
| 21 | 20 | 0.40 | 4.49 | 25.73 | 197 | 282 | 172 | 292 |
| 22 | 20 | 0.60 | 4.52 | 25.44 | 192 | 282 | 72 | 137 |
| 23 | 20 | 0.80 | 4.62 | 25.51 | 161 | 270 | 62 | 142 |
| 24 | 20 | 1.00 | 4.62 | 25.83 | 223 | 283 | 62 | 137 |
| 25 | 20 | 1.50 | 4.72 | 25.80 | 208 | 284 | 78 | 143 |
| 26 | 20 | 2.00 | 4.77 | 25.57 | 171 | 271 | 52 | 157 |
| 27 | 20 | 3.00 | 4.92 | 24.95 | 201 | 280 | 37 | 82 |
| 28 | 20 | 4.00 | 5.05 | 25.02 | 197 | 271 | 52 | 131 |
| 29 | 20 | 5.00 | 5.39 | 24.22 | 159 | 239 | 48 | 93 |

Examples 30–39: Sodium HLS Composite Material; $SiC_2/Na_2O=3.22$; ions: $H_3O^+$ A hydrated layered sodium silicate/amorphous sodium silicate composite material was prepared according to the following process. Twenty grams of product from Example 3 was slurried in 300 milliliters of $DI^2$-water containing various amounts of hydrochloric acid (HCl), as described in Table 3, for 2 minutes followed by filtering and drying at ambient conditions. The product was pulverized by ball milling. X-ray diffraction revealed that a kanemite phase was present.

Elemental analysis indicated that the $SiO_2/Na_2O$ ratio of the products synthesized depended on the concentration of hydronium ions used during the hydrolysis step, as may be seen in Table 3. Hardness ion binding performance was observed to vary with the $SiO_2$/Alkali ratio of the resulting product (which was a function of the $H_3O^+$ concentration), as observed in Table 3.

TABLE 3

Hydrated Layered Silicates Syntheiszed by Hydrolysis of Delta Phase Product with a SiO$_2$/Na$_2$O of 3.22 from Example 3

| Example No. | Amount of product from Example 3 (grams) | meq H$_3$O$^+$/gram anhydrous product from Example 3 (acid used was 2N HCl) | SiO$_2$/Na$_2$O | LOI % | CER | CEC | MgER | MgEC |
|---|---|---|---|---|---|---|---|---|
| 30 | 20 | 0    | 4.40 | 19.35 | 249 | 284 | 15 | 49 |
| 31 | 20 | 0.20 | 4.52 | 19.60 | 235 | 279 | 24 | 24 |
| 32 | 20 | 0.40 | 4.66 | 19.13 | 224 | 282 | 24 | 35 |
| 33 | 20 | 0.60 | 5.08 | 21.84 | 224 | 258 | 24 | 44 |
| 34 | 20 | 0.80 | 5.02 | 21.67 | 230 | 275 | 24 | 39 |
| 35 | 20 | 1.00 | 5.16 | 20.01 | 211 | 269 | 20 | 20 |
| 36 | 20 | 1.50 | 5.37 | 18.75 | 204 | 276 | 5  | 20 |
| 37 | 20 | 2.00 | 5.68 | 19.69 | 215 | 254 | 15 | 20 |
| 38 | 20 | 3.00 | 5.73 | 18.21 | 187 | 231 | 10 | 49 |
| 39 | 20 | 4.00 | 7.19 | 20.19 | 132 | 185 | 15 | 34 |

Comparative Examples 40–43: Sodium HLS Composite Material; SiC$_2$/Na$_2$O=2.0; ions utilized for hydrolysis: OH—

A hydrated layered sodium silicate/amorphous sodium silicate composite material was prepared according to the following process. Twenty grams of product from Example 1 was slurried in 300 milliliters of DI$^2$-water containing various amounts of sodium hydroxide (NaOH) pellets, as described in Table 4, for 2 minutes followed by filtering and drying at ambient conditions. X-ray diffraction revealed that a kanemite phase was present.

Elemental analysis indicated that the-SiO$_2$/Na$_2$O ratio of the products synthesized depended on the concentration of hydroxyl ions used during the hydrolysis step. Hardness ion performance was observed to vary with the SiC$_2$/Na$_2$O ratio of the hydrated layered sodium silicate/amorphous sodium silicate composite product, as observed in Table 4.

Hardness ion binding performance and the SiO$_2$/Na$_2$O ratio of the sodium HLS composite products can be found in Table 5. It should be noted that the SiO$_2$/Na$_2$O ratios of the resulting products did not change from the original SiO$_2$/Na$_2$O ratios since the material was spray dried. This is in contrast to previous examples where the products were synthesized and filtered resulting in the removal of some soluble material in the supernatant liquid during the filtering step.

It can be concluded from this example and the above-mentioned examples 10 that the hardness ion binding performance is dependent on the processing of the hydrolyzed

TABLE 4

Hydrated Layered Silicates Syntheiszed by the Hydrolysis of Delta Phase Product with a SiO$_2$/Na$_2$O of 2.0 from Example 1

| Example No. | Amount of product from Example 1 (grams) | meq OH$^-$/gram anhydrous product from Example 1 (base used was NaOH pellets) | SiO$_2$/Na$_2$O | LOI % | CER | CEC | MgER | MgEC |
|---|---|---|---|---|---|---|---|---|
| 40 | 20 | 0    | 3.24 | 26.72 | 265 | 325 | 251 | 303 |
| 41 | 20 | 2.0  | 3.22 | 26.80 | 277 | 337 | 265 | 311 |
| 42 | 20 | 20.0 | 2.91 | 24.86 | 240 | 294 | 243 | 298 |
| 43 | 20 | 50.0 | 2.51 | 20.06 | 225 | 283 | 219 | 261 |

Comparative Examples 44–45: Sodium HLS Composite Material of the present invention; varying SiO$_2$/Na$_2$O ratio; ions utilized for hydrolysis: H$_3$O$^+$; Spray dried A hydrated layered sodium silicate/amorphous sodium silicate composite materials were prepared according to the process of the present invention as follows. Two hundred grams of material from each of Examples 44 and 45, were slurried in 1000 milliliters of DI$^2$-H$_2$O containing various amounts HCl, as described in Table 5, for 15 minutes. Each slurry was then introduced into a spray tower through either a wheel atomizer or a nozzle atomizer using an inlet temperature of 150° to 300° C., an outlet temperature of 50° to 100° C., and a feed rate of 10 to 75 cc/min, depending on the particular product processed. Product from the main chamber and cyclone chamber were combined. X-ray diffraction revealed that a kanemite phase was present in all cases.

product. Specifically, comparing example 44 to example 10, the SiO$_2$/Na$_2$O ratios of the resulting products are very similar, but the properties of the materials differ. The magnesium ion binding capacity of the spray dried materials (example 44) is much higher than the magnesium ion binding capacity of the synthesized and filtered materials (examples 10). However, the calcium ion binding capacity of the spray dried materials (examples 44) is comparative to the calcium ion binding performance of the synthesized and filtered materials (examples 10). Thus, the processing of the material dictates the properties of the resulting product.

TABLE 5

Hardness Ion Performance of Hydrated Layered Sodium Silicate/Amorphous Sodium Silicate Spray Dried Composite Products

| Example No. | Feedstock from Example . . . | meq $H_3O^+$/gram anhydrous product (acid used was 2N HCl) | $SiO_2/Na_2O$ | LOI % | CER | CEC | MgER | MgEC |
|---|---|---|---|---|---|---|---|---|
| 44 | 1 | 1.5 | 2.00 | 24.39 | 305 | 315 | 347 | 397 |
| 45 | 3 | 0.5 | 3.22 | 9.13 | 225 | 280 | 242 | 283 |

Examples 46–121: Preparation of Hyrated Layered Na,K-Silicate/Amorphous Na,K-Silicate Composites (DB-2 Phase) - Materials of the Present Invention Examples 46–58: DB-2 Phase Composite Material; $SiO_2/(0.9Na_2O+0.1K_2O)=2.0$; ions utilized for hydrolysis: $H_3O^+$ A DB-2 phase composite material was prepared according to the process of our invention as follows. Twenty grams of product from Example 5 was slurried in 300 milliliters of $DI^2$-water containing various amounts of hydrochloric acid (HCl), as described in Table 6, for 2 minutes followed by filtering and drying at ambient conditions. The product was pulverized by ball milling. X-ray diffraction revealed that a kanemite phase was present.

Elemental analysis indicated that the $SiO_2$/Alkali ratio of the products depended on the concentration of hydronium ions used during the hydrolysis step, as may be seen in Table 6. Hardness ion binding performance was observed to vary with the $SiO_2$/Alkali ratio of the resulting product (which was a function of the $H_3O^+$ concentration), as observed in Table 6.

TABLE 6

Hydrated Layered Na—K Silicates/Amorphous Na—K Silicate Composites Synthesized by Hydrolysis of Crystalline DB-1 Silicates with a $SiO_2/(0.9\ Na_2O + 0.1\ K_2O) = 2.0$ from Example 5

| Example No. | Amount of product from Example 5 (grams) | meq $H_3O^+$/gram anhydrous product from Example 5 (acid used was 2N HCl) | $SiO_2$/Alkali Ratio | LOI % | CER | CEC | MgER | MgEC |
|---|---|---|---|---|---|---|---|---|
| 46 | 20 | 0 | 2.85 | 26.62 | 250 | 290 | 285 | 351 |
| 47 | 20 | 0.2 | 2.91 | 26.33 | 240 | 300 | 295 | 350 |
| 48 | 20 | 0.4 | 2.93 | 27.03 | 250 | 305 | 270 | 330 |
| 49 | 20 | 0.6 | 2.97 | 26.70 | 240 | 290 | 245 | 320 |
| 50 | 20 | 0.8 | 2.98 | 27.24 | 245 | 287 | 230 | 295 |
| 51 | 20 | 1.0 | 3.07 | 26.80 | 235 | 275 | 225 | 316 |
| 52 | 20 | 1.5 | 3.19 | 27.82 | 240 | 275 | 220 | 292 |
| 53 | 20 | 2.0 | 3.38 | 27.65 | 237 | 279 | 222 | 286 |
| 54 | 20 | 3.0 | 3.53 | 27.74 | 201 | 268 | 150 | 240 |
| 55 | 20 | 4.0 | 3.74 | 27.40 | 181 | 275 | 127 | 191 |
| 56 | 20 | 5.0 | 4.16 | 26.77 | 140 | 219 | 104 | 158 |
| 57 | 20 | 7.5 | 7.76 | 21.97 | 125 | 160 | 62 | 117 |
| 58 | 20 | 10.0 | 43.09 | 17.79 | 55 | 60 | 13 | 23 |

Examples 59–71: DB-2 Phase Composite Material; $SiO_2/(0.8Na_2O+0.2K_2O)=2.0$; ions utilized for hydrolysis: $H_3O^+$ A DB-2 phase composite material was prepared according to the process of our invention as follows. Twenty grams of product from Example 6 was slurried in 300 milliliters of $DI^2$-water containing various amounts of hydrochloric acid (HCl), as described in Table 7, for 2 minutes followed by filtering and drying at ambient conditions. The product was pulverized by ball milling. X-ray diffraction revealed that a kanemite phase was present.

Elemental analysis indicated that the $SiO_2$/Alkali ratio of the products depended on the concentration of hydronium ions used during the hydrolysis step, as may be seen in Table 7. Hardness ion binding performance was observed to vary with the $SiO_2$/Alkali ratio of the resulting product (which was a function of the $H_3O^+$ concentration), as observed in Table 7.

TABLE 7

Hydrated Layered Na—K Silicates/Amorphous Na—K Siliccate Composites Syntheiszed by Hydrolysis of Crystalline DB-1 Silicates with a $SiO_2/(0.8\ Na_2O + 0.2\ K_2O) = 2.0$ from Example 6

| Example No. | Amount of product from Example 6 (grams) | meq $H_3O^+$/gram anhydrous product from Example 6 (acid used was 2N HCl) | $SiO_2$/Alkali Ratio | LOI % | CER | CEC | MgER | MgEC |
|---|---|---|---|---|---|---|---|---|
| 59 | 20 | 0    | 2.80  | 29.21 | 225 | 270 | 265 | 340 |
| 60 | 20 | 0.2  | 2.89  | 28.95 | 229 | 279 | 204 | 299 |
| 61 | 20 | 0.4  | 2.88  | 28.90 | 195 | 270 | 160 | 256 |
| 62 | 20 | 0.6  | 2.91  | 28.70 | 185 | 265 | 100 | 195 |
| 63 | 20 | 0.8  | 2.97  | 29.50 | 185 | 275 | 70  | 115 |
| 64 | 20 | 1.0  | 2.99  | 29.40 | 180 | 280 | 70  | 140 |
| 65 | 20 | 1.5  | 3.07  | 29.00 | 145 | 265 | 105 | 150 |
| 66 | 20 | 2.0  | 3.22  | 29.04 | 150 | 275 | 70  | 140 |
| 67 | 20 | 3.0  | 3.50  | 29.34 | 160 | 280 | 65  | 130 |
| 68 | 20 | 4.0  | 3.71  | 28.31 | 170 | 255 | 55  | 115 |
| 69 | 20 | 5.0  | 4.13  | 27.55 | 145 | 230 | 60  | 115 |
| 70 | 20 | 7.5  | 7.02  | 22.33 | 120 | 165 | 50  | 105 |
| 71 | 20 | 10.0 | 31.03 | 17.91 | 20  | 20  | 15  | 20  |

Examples 72–84: DB-2 Phase Composite Material; $SiO_2/(0.9Na_2O+0.1K_2O)=2.4$; ions utilized for hydrolysis: $H_3O^+$ A DB-2 phase composite material was prepared according to the process of our invention as follows. Twenty grams of product from Eaample 7 was slurried in 300 milliliters of $DI^2$-water containing various amounts of hydrochloric acid (HCl), as described in Table 8, for 2 minutes followed by filtering and drying at ambient conditions. The product was pulverized by ball milling. X-ray diffraction revealed that a kanemite phase was present.

Elemental analysis indicated that the $SiO_2$/Alkali ratio of the products depended on the concentration of hydronium ions used during the hydrolysis step, as may be seen in Table 8. Hardness ion binding performance was observed to vary with the $SiO_2$/Alkali ratio of the resulting product (which was a function of the $H_3O^+$ concentration), as observed in Table 8.

Examples 85–97: DB-2 Phase Composite Material; $SiO_2/(0.9Na_2O+0.1K_2O)=3.22$; ions utilized for hydrolysis: $H_3O^+$ A DB-2 phase composite material was prepared according to the process of our invention as follows. Twenty grams of product from Example 8 was slurried in 300 milliliters of $DI^2$-water containing various amounts of hydrochloric acid (HCl), as described in Table 9, for 2 minutes followed by filtering and drying at ambient conditions. The product was pulverized by ball milling. X-ray diffraction revealed that a kanemite phase was present.

Elemental analysis indicated that the $SiO_2$/Alkali ratio of the products depended on the concentration of hydronium ions used during the hydrolysis step, as may be seen in Table 9. Hardness ion binding performance was observed to vary with the $SiO_2$/Alkali ratio of the resulting product (which was a function of the $H_3O^+$ concentration), as observed in Table 9.

TABLE 8

Hydrated Layered Na—K Silicates/Amorphous Na—K Siliccate Composites Syntheiszed by Hydrolysis of Crystalline DB-1 Silicates with a $SiO_2/(0.9\ Na_2O + 0.1\ K_2O) = 2.4$ from Example 7

| Example No. | Amount of product from Example 7 (grams) | meq $H_3O^+$/gram anhydrous product from Example 7 (acid used was 2N HCl) | $SiO_2$/Alkali Ratio | LOI % | CER | CEC | MgER | MgEC |
|---|---|---|---|---|---|---|---|---|
| 72 | 20 | 0    | 2.90  | 25.04 | 260 | 286 | 215 | 250 |
| 73 | 20 | 0.2  | 2.94  | 24.39 | 262 | 306 | 230 | 280 |
| 74 | 20 | 0.4  | 2.99  | 23.69 | 250 | 290 | 240 | 295 |
| 75 | 20 | 0.6  | 3.02  | 22.29 | 245 | 285 | 190 | 275 |
| 76 | 20 | 0.8  | 3.06  | 22.57 | 230 | 288 | 170 | 250 |
| 77 | 20 | 1.0  | 3.09  | 21.61 | 215 | 275 | 119 | 237 |
| 78 | 20 | 1.5  | 3.22  | 21.70 | 221 | 282 | 100 | 229 |
| 79 | 20 | 2.0  | 3.39  | 21.08 | 204 | 274 | 96  | 215 |
| 80 | 20 | 3.0  | 3.84  | 20.75 | 209 | 269 | 81  | 202 |
| 81 | 20 | 4.0  | 4.62  | 19.78 | 195 | 275 | 85  | 165 |
| 82 | 20 | 5.0  | 5.41  | 19.35 | 162 | 241 | 67  | 110 |
| 83 | 20 | 7.5  | 13.25 | 15.45 | 129 | 155 | 53  | 70  |
| 84 | 20 | 10.0 | 14.14 | 15.52 | 50  | 65  | 45  | 60  |

TABLE 9

Hydrated Layered Na—K Silicates/Amorphous Na—K Silicates Composites Syntheiszed by Hydrolysis of Crystalline DB-1 Silicates with a SiO$_2$/(0.9 Na$_2$O + 0.1 K$_2$O) = 3.22 from Example 8

| Example No. | Amount of product from Example 8 (grams) | meq H$_3$O$^+$/gram anhydrous product from Example 8 (acid used was 2N HCl) | SiO$_2$/Alkali Ratio | LOI % | CER | CEC | MgER | MgEC |
|---|---|---|---|---|---|---|---|---|
| 85 | 20 | 0 | 4.33 | 20.23 | 250 | 289 | 75 | 115 |
| 86 | 20 | 0.2 | 4.35 | 21.46 | 241 | 287 | 70 | 150 |
| 87 | 20 | 0.4 | 4.48 | 19.72 | 249 | 291 | 60 | 140 |
| 88 | 20 | 0.6 | 4.62 | 20.64 | 239 | 279 | 50 | 121 |
| 89 | 20 | 0.8 | 4.75 | 20.51 | 242 | 283 | 48 | 109 |
| 90 | 20 | 1.0 | 5.0 | 19.27 | 231 | 276 | 55 | 95 |
| 91 | 20 | 1.5 | 5.42 | 18.38 | 225 | 268 | 50 | 85 |
| 92 | 20 | 2.0 | 6.06 | 19.48 | 216 | 262 | 45 | 75 |
| 93 | 20 | 3.0 | 6.12 | 19.33 | 201 | 270 | 40 | 65 |
| 94 | 20 | 4.0 | 6.29 | 20.59 | 187 | 221 | 35 | 55 |
| 95 | 20 | 5.0 | 8.51 | 19.23 | 78 | 159 | 30 | 48 |
| 96 | 20 | 7.5 | 42.41 | 10.91 | 55 | 77 | 25 | 35 |
| 97 | 20 | 10.0 | 77.09 | 8.73 | 21 | 35 | 20 | 30 |

Examples 98–101: DB-2 Phase Composite Material; SiO$_2$/(0.9Na$_2$O+0.1K$_2$O)=2.0; ions utilized for hydrolysis: OH—

A DB-2 phase composite material was prepared according to the process of our invention as follows. Twenty grams of product from Example 5 was slurried in 300 milliliters of DI1$^2$-water containing various amounts of sodium hydroxide (NaOH) pellets, as described in Table 10, for 2 minutes followed by filtering and drying at ambient conditions. The product was pulverized by ball milling. X-ray diffraction revealed that a kanemite phase was present.

Elemental analysis indicated that the SiO$_2$/Alkali ratio of the products depended on the concentration of hydronium ions used during the hydrolysis step, as may be seen in Table 10. Hardness ion binding performance was observed to vary with the SiO$_2$/Alkali ratio of the resulting product (which was a function of the OH— concent-ation), as observed in Table 10.

Examples 102–105: DB-2 Phase Comocsite Material; SiO$_2$/(0.9Na$_2$O+0.1K$_2$O)=2.0; ions utilized for hydrolysis: OH—

A DB-2 phase composite material was prepared according to the process of our invention as follows. Twenty grams of product from Example S was slurried in 300 milliliters of DI$^2$-water containing various amounts of potassium hydroxide (KOH) pellets, as described in Table 11, for 2 minutes followed by filtering and drying at ambient conditions. The product was pulverized by ball milling. X-ray diffraction revealed that a kanemite phase was present.

Elemental analysis indicated that the SiO$_2$/Alkali ratio of the products depended on the concentration of hydroxyl ions used during the hydrolysis step, as may be seen in Table 11. Hardness ion binding performance was observed to vary with the SiO$_2$/Alkali ratio of the resulting product (which was a function of the OH— concentration), as observed in Table 11.

TABLE 10

Hydrated Layered Na—K Silicate/Amorphous Na—K Silicates Composites Syntheiszed by the Hydrolysis of Crystalline DB-1 Silicates with a SiO$_2$/(0.9 Na$_2$O + 0.1 K$_2$O) 2.0 from Example 5

| Example No. | Amount of product from Example 5 (grams) | meq OH$^-$/gram anhydrous product from Example 5 (base used was NaOH pellets) | SiO$_2$/Alkali Ratio | LOI % | CER | CEC | MgER | MgEC |
|---|---|---|---|---|---|---|---|---|
| 98 | 20 | 0 | 2.85 | 26.62 | 250 | 290 | 285 | 351 |
| 99 | 20 | 2.0 | 2.78 | 24.24 | 240 | 289 | 274 | 335 |
| 100 | 20 | 20.0 | 2.54 | 25.01 | 225 | 282 | 269 | 311 |
| 101 | 20 | 50.0 | 2.46 | 24.79 | 216 | 277 | 245 | 288 |

TABLE 11

Hydrated Layered Na—K Silicate/Amorphous Na—K Silicates Composites Syntheiszed by the Hydrolysis of Crystalline DB-1 Silicates with a $SiO_2/(0.9\ Na_2O + 0.1\ K_2O)$ 2.0 from Example 5

| Example No. | Amount of product from Example 5 (grams) | meq OH⁻/gram anhydrous product from Example 5 (base used was KOH pellets) | $SiO_2$/Alkali Ratio | LOI % | CER | CEC | MgER | MgEC |
|---|---|---|---|---|---|---|---|---|
| 102 | 20 | 0 | 2.85 | 26.62 | 250 | 290 | 285 | 351 |
| 103 | 20 | 2.0 | 2.85 | 27.51 | 242 | 287 | 275 | 332 |
| 104 | 20 | 20.0 | 2.58 | 28.38 | 220 | 283 | 273 | 311 |
| 105 | 20 | 50.0 | 2.11 | 28.83 | 195 | 268 | 231 | 250 |

Examples 106–118: DB-2 Phase Composite Material; Ground Glass/KOH/DI²-H₂O; ions utilized for hydrolysis: $H_3O^+$ A DB-2 phase composite material was prepared according to the process of our invention as follows. Twenty grams of product from Example 9 was slurried in 300 milliliters of DI²-water containing various amounts of hydrochloric acid (HCl), as described in Table 12, for 2 minutes followed by filtering and drying at ambient conditions. The product was pulverized by ball milling. X-ray diffraction revealed that a kanemite phase was present.

Elemental analysis indicated that the $SiO_2$/Alkali ratio of the products depended on the concentration of hydronium ions used during the hydrolysis step, as may be seen in Table 12. Hardness ion binding performance was observed to vary with the $SiO_2$/Alkali ratio of the resulting product (which was a function of the $H_3O^+$ concentration), as observed in Table 12.

depending on the particular product processed. Product from the main chamber and cyclone chamber were combined. X-ray diffraction revealed that a kanemite phase was present in all cases.

Hardness ion binding performance and the $SiO_2$/Alkali ratio of the Sodium/Potassium HLS composite products can be found in Table 13. It should be noted that the $SiO_2$/Alkali ratios of the resulting products did not change from the original $SiO_2$/Alkali ratios since the material was spray dried. This is in contrast to previous examnples where the products were synthesized and filtered resulting in the removal of some soluble material in the supernatant liquid during the filtering step.

It can be concluded from this example and the above-mentioned examples, 44 and 45, that the hardness ion binding performance is also dependent on the processing of the hydrolyzed product. Specifically, comparing examples 120 and 121 to examples 44 and 45, respectively, it can be seen that the hardness ion binding performance is very

TABLE 12

Hydrated Layered Na—K Silicates/Amorphous Na—K Silicate Composites Synthesized by Hydrolysis of Crystalline DB-1 Silicates with a $SiO_2$/__ $Na_2O$ + __ $K_2O$) = __ from Example 9

| Example No. | Amount of product from Example 9 (grams) | meq $H_3O^+$/gram anhydrous product from Example 9 (acid used was 2N HCl) | $SiO_2$/Alkali Ratio | LOI % | CER | CEC | MgER | MgEC |
|---|---|---|---|---|---|---|---|---|
| 106 | 20 | 0 | 2.95 | 24.25 | 235 | 290 | 288 | 338 |
| 107 | 20 | 0.2 | 3.03 | 23.01 | 220 | 285 | 268 | 323 |
| 108 | 20 | 0.4 | 3.07 | 22.47 | 230 | 291 | 237 | 297 |
| 109 | 20 | 0.6 | 3.09 | 19.77 | 225 | 285 | 242 | 292 |
| 110 | 20 | 0.8 | 3.22 | 23.69 | 206 | 277 | 230 | 280 |
| 111 | 20 | 1.0 | 3.39 | 22.29 | 210 | 265 | 189 | 245 |
| 112 | 20 | 1.5 | 3.84 | 21.61 | 190 | 271 | 172 | 242 |
| 113 | 20 | 2.0 | 3.91 | 21.70 | 201 | 246 | 158 | 235 |
| 114 | 20 | 3.0 | 4.24 | 20.75 | 179 | 235 | 145 | 237 |
| 115 | 20 | 4.0 | 4.62 | 19.35 | 161 | 202 | 120 | 205 |
| 116 | 20 | 5.0 | 5.41 | 19.78 | 138 | 189 | 62 | 138 |
| 117 | 20 | 7.5 | 13.32 | 15.45 | 114 | 175 | 57 | 112 |
| 118 | 20 | 10.0 | 54.14 | 15.52 | 25 | 45 | 10 | 25 |

Examples 119–121: DB-2 Phase Composite Material of the present invention; varying $SiO_2$/Alkali ratio; ions utilized for hydrolysis: $H_3O^+$; Spray dried DB-2 phase composite materials were prepared according to the process of the present invention as follows. Two hundred grams of material from each of Examples 4, 5, and 8 were slurried in 1000 milliliters of DI²-H₂O containing various amounts HCl, as described in Table 13, for 15 minutes. Each slurry was then introduced into a spray tower through either a wheel atomizer or a nozzle atomizer using an inlet temperature of 150° to 300° C., an outlet temperature of 50° to 100° C., and a feed rate of 10 to 75 cc/min, similar, at near identical $SiO_2$/Alkali ratios. However, comparing hydrated layered alkali silicates/amorphous alkali silicates composites produced by spray drying to hydrated layered alkali silicates/amorphous alkali silicates composites produced by slurrying and filtering, reveals that spray drying produces a product composition which is identical to the precursor composition and a product that has superior hardness ion binding performance. Thus, the processing of the material dictates the properties of the resulting product.

TABLE 13

Hardness Ion Performance of Hydrated Layered Na—K Silicate/Amorphous Na—K Silicate Spray Dried Composite Products

| Example No. | Feedstock from Example ... | meq $H_3O^+$/gram anhydrous product (acid used was 2N HCl) | $SiO_2$/Alkali Ratio | LOI % | CER | CEC | MgER | MgEC |
|---|---|---|---|---|---|---|---|---|
| 119 | 4 | 1.5 | 1.7 | 13.94 | 320 | 343 | 408 | 433 |
| 120 | 5 | 0.5 | 2.0 | 14.07 | 270 | 295 | 350 | 380 |
| 121 | 8 | 3.0 | 3.22 | 14.13 | 225 | 275 | 215 | 265 |

Examples 122–124: Comparison of Materials of Present Invention to Prior Art

Example 122: Comparison of DB-2 Phase Composites to Hydrated Layered Na- Composites Produced from their Crystalline Precursors having $SiO_2$/Alkali=2 and $H_3O^+$ ions.

Comparing Examples 48 to 15 (both having a similar $SiO_2$/Alkali ratio) revealed that the CER and CEC improved by 67% and 11%, respectively, and the MgER and MgEC improved by 121% and 79%, respectively, as seen in Table 14. The increase in hardness ion binding performance may be due to the presence of K in the composite.

For equivalent calcium ion binding performance, one must compare Examples 47 and 12, however, it should be noted that the $SiO_2$/Alkali ratio of these two composites are different. This indicates that the composition and processing of the crystalline silicate precursor are important factors in producing the composite of our invention.

TABLE 14

Comparison of Hardness Ion Binding Performance at 25° C. of Hydrated Layered Sodium/Potassium Silicates Products (from Example 47 and 48) to Hydrated Layered Sodium Silicate Products (from Examples 12 and 15)

| Example No. | $SiO_2$/Alkali Ratio | CER | CEC | MgER | MgEC |
|---|---|---|---|---|---|
| 12 | 2.74 | 241 | 294 | 225 | 324 |
| 15 | 2.93 | 150 | 275 | 122 | 184 |
| 47 | 2.91 | 240 | 300 | 295 | 350 |
| 48 | 2.93 | 250 | 305 | 270 | 330 |

Example 123: Comparison of DB-2 Phase Composites to Hydrated Layered Na- Composites Produced from their Crystalline Precursors having $SiO_2$/Alkali=2.4 and 3.22 and $H_3O^+$ ions.

At similar $SiO_2$/Alkali ratios, the DB-2 products of this invention exhibit comparable calcium binding performances to the Na-HLS system, but higher magnesium binding performances. This can be seen when comparing examples 19 to example 80 and example 32 to example 88, see Table 15. This may also be attributable to the potassium in the DB-2 material.

TABLE 15

Comparison of Hardness Ion Binding Performance at 25° C. of Hydrated Layered Sodium/Potassium Silicates Products (from Example 80 and 88) to Hydrated Layered Sodium Silicate Products (from Examples 19 and 32)

| Example No. | $SiO_2$/Alkali Ratio | CER | CEC | MgER | MgEC |
|---|---|---|---|---|---|
| 19 | 3.94 | 206 | 277 | 63 | 163 |
| 32 | 4.66 | 224 | 282 | 24 | 35 |
| 80 | 3.84 | 209 | 269 | 81 | 202 |
| 88 | 4.62 | 239 | 279 | 50 | 121 |

Example 124: Comparison of DB-2 Phase Composites to Hydrated Layered Na- Composites Produced from their Crystalline Precursors having $SiO_2$/Alkali=2 and OH— ions.

Comparing Examples 100 to 43 (both having a similar $SiO_2$/Alkali ratio and produced using NaOH as the hydrolyzing agent to synthesize the composites) revealed that the calcium ion binding performance are comparable, whereas the MgER and MgEC increased by 23% and 19%, respectively, as seen in Table 16. When KOH was used as the hydrolyzing agent, example 104, the hardness ion binding performance was similar to a composite produced using NaOH as the hydrolyzing agent, example 100. Overall, the presence of potassium in the DB-2 composite enhances the magnesium hardness binding performance as well as the calcium hardness ion binding performance

TABLE 16

Comparison of Hardness Ion Binding Performance at 25° C. of Hydrated Layered Sodium/Potassium Silicates Products (from Example 100 and 104) to Hydrated Layered Sodium Silicate Products (from Example 43)

| Example No. | $SiO_2$/Alkali Ratio | CER | CEC | MgER | MgEC |
|---|---|---|---|---|---|
| 43 | 2.51 | 225 | 283 | 219 | 261 |
| 100 | 2.54 | 225 | 282 | 269 | 311 |
| 104 | 2.58 | 220 | 283 | 273 | 311 |

It is to be understood that both the foregoing general description and the following detailed description are exemplary, but are not restrictive, of the invention.

What is claimed is:

1. A detergent builder composition comprising 5 to 95 weight % of a composite of crystalline hydrated layered sodium and potassium silicate and amorphous sodium and potassium silicate, wherein said crystalline hydrated layered sodium and potassium silicate has an x-ray diffraction pattern having d-spacings of 10.30 Å, 5.13 Å, 4.02 Å, 3.63 Å, 3.43 Å, 3.16 Å, 3.09 Å, 2.47 Å, 2.42 Å, and 2.09 Å and the balance being at least one co-builder.

2. A cleaning composition comprising a surfactant and a builder comprising a composite of crystalline hydrated layered sodium and potassium silicate and amorphous sodium and potassium silicate wherein said crystalline hydrated layered sodium and potassium silicate has an x-ray diffraction pattern having d-spacings of 10.30 Å, 5.13 Å, 4.02 Å, 3.63 Å, 3.43 Å, 3.16 Å, 3.09 Å, 2.47 Å, 2.42 Å, and 2.09 Å.

3. The cleaning composition of claim 2 wherein said composite has a $SiO_2/Na_2O$ ratio between 1.7 and 14.25 and a hardness ion binding capacity of up to 7.0 milliequivalents $Ca^{2+}$ per gram of anhydrous product and up to 8.7 milliequivalents $Mg^{2+}$ per gram of anhydrous product.

4. The cleaning composition of claim 3 wherein said composition further comprises a co-builder effective in reducing the activity of calcium in solution.

5. The cleaning composition of claim 4 wherein said co-builder is a crystalline alumina silicate.

6. The cleaning composition of claim 5 wherein said composition includes 5 to 75 weight % total builder and cobuilder which comprises 5 to 95 weight % of said builder and 95 to 5 weight % of said co-builder.

7. The cleaning composition of claim 2 wherein said composition includes 5 to 75 weight a total builder and co-builder which comprises 5 to 95 weight a of said builder and 95 to 5 weight % of said co-builder.

8. The cleaning composition of claim 7, wherein said co-builder is a zeolite.

9. The cleaning composition of claim 8, wherein said zeolite is selected from the group consisting of Zeolite NaA, Zeolite P, Zeolite NaX, and Zeolite K/NaX.

10. A detergent builder comprising a crystalline hydrated layered sodium and potassium silicate produced by a process comprising the steps of:

heating an amorphous sodium/potassium silicate, wherein the molar ratio of $SiO_2$ to $Na_2O$ and $K_2O$ in said sodium/potassium silicate is between 1.7 and 3.22, for a time of at least about fifteen minutes and at a temperature between about 500° C. and about 800° C. in the optional presence of water to produce a material comprising predominantly crystalline disilicate;

hydrolyzing said material with a hydrolyzing agent selected to provide hydrolyzing ions selected from the group consisting of $H_3O^+$ and $OH^-$ to produce a crystalline hydrated layered sodium and potassium silicate product; and separating by filtering or spray drying said product from said hydrolyzing agent.

11. A detergent builder comprising a crystalline hydrated layered sodium and potassium silicate produced by a process comprising the steps of:

dissolving an amorphous sodium/potassium silicate in water to form a solution, wherein the molar ratio of $SiO_2$ to $Na_2O$ and $K_2O$ in said sodium/potassium silicate is between 1.7 and 3.22;

spray drying said solution to produce a hydrous sodium/potassium polysilicate;

heating said hydrous sodium/potassium polysilicate for a time of at least fifteen minutes and at a temperature between about 500° C. and about 800° C. to produce a material comprising predominantly crystalline disilicate;

hydrolyzing said material with a hydrolyzing agent selected to provide hydrolyzing ions selected from the group consisting of $H_3O^+$ and $OH^-$ to produce a crystalline hydrated layered sodium and potassium silicate product; and separating by filtering or spray drying said product from said hydrolyzing agent.

12. A detergent builder comprising a crystalline hydrated layered sodium and potassium silicate produced by a process comprising the steps of:

mixing an amorphous sodium silicate glass with a potassium source and water solution to form a mixture;

heating said mixture for a time of at least fifteen minutes and at a temperature between about 500° C. and about 800° C. to produce a material comprising predominantly crystalline disilicate;

hydrolyzing said material with a hydrolyzing agent selected to provide hydrolyzing ions selected from the group consisting of $H_3O^+$ and $OH^-$ to produce a crystalline hydrated layered sodium and potassium silicate product; and separating by filtering or spray drying said product from said hydrolyzing agent.

13. The detergent builder of claim 12 wherein said potassium source is selected from the group consisting of potassium hydroxide, potassium nitrate, and a potassium halide.

* * * * *

UNITED STATES PATENT AND TRADEMARK OFFICE
CERTIFICATE OF CORRECTION

PATENT NO. : 5,776,893
DATED : July 7, 1998
INVENTOR(S) : Eric von Rehren Borgstedt et al.

It is certified that error appears in the above-identified patent and that said Letters Patent is hereby corrected as shown below:

On the first page of the patent, at [75], delete "Von" and insert --von--.

At column 27, line 23, after "weight", delete "a" and insert --%--.

At column 27, line 24, after "weight", delete "a" and insert --%--.

Signed and Sealed this

Twenty-second Day of December, 1998

*Attest:*

BRUCE LEHMAN

*Attesting Officer*     *Commissioner of Patents and Trademarks*